United States Patent Office 3,767,724
Patented Oct. 23, 1973

3,767,724
EXTRACTIVE CRYSTALLIZATION METHOD FOR THE SEPARATION OF MIXTURES OF ALKENES AND ALKANES
Tan Hok Gouw, El Cerrito, Calif., assignor to Chevron Research Company, San Francisco, Calif.
Filed Oct. 15, 1971, Ser. No. 189,579
Int. Cl. C07c 9/00, 11/12
U.S. Cl. 260—676 R      4 Claims

ABSTRACT OF THE DISCLOSURE

An acyclic hydrocarbon mixture containing a crystallizable alkane component and an alkene component is separated by an extractive crystallization using liquid carbon dioxide.

BACKGROUND OF THE INVENTION

Field of the invention

Figure 1:
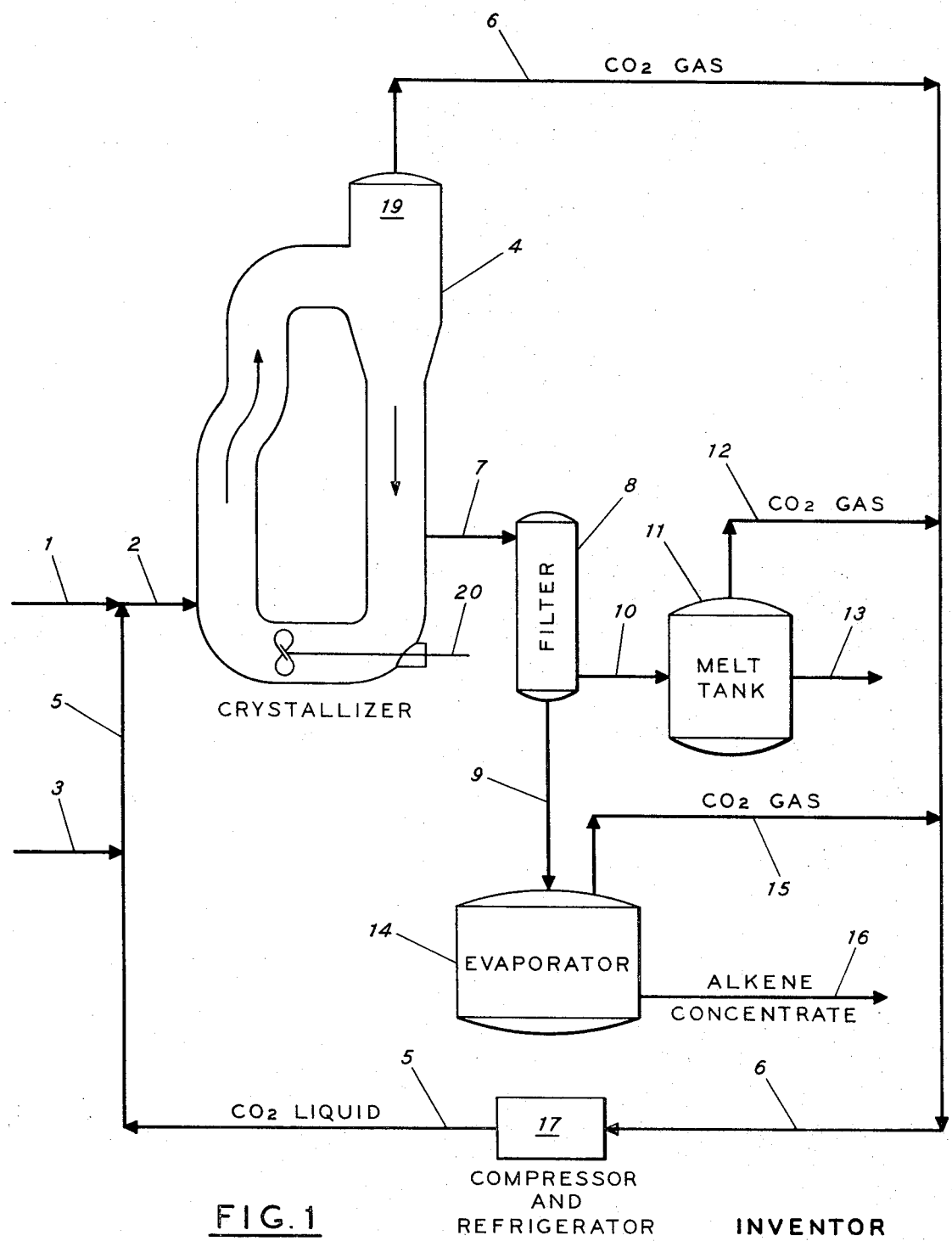
Figure 2:
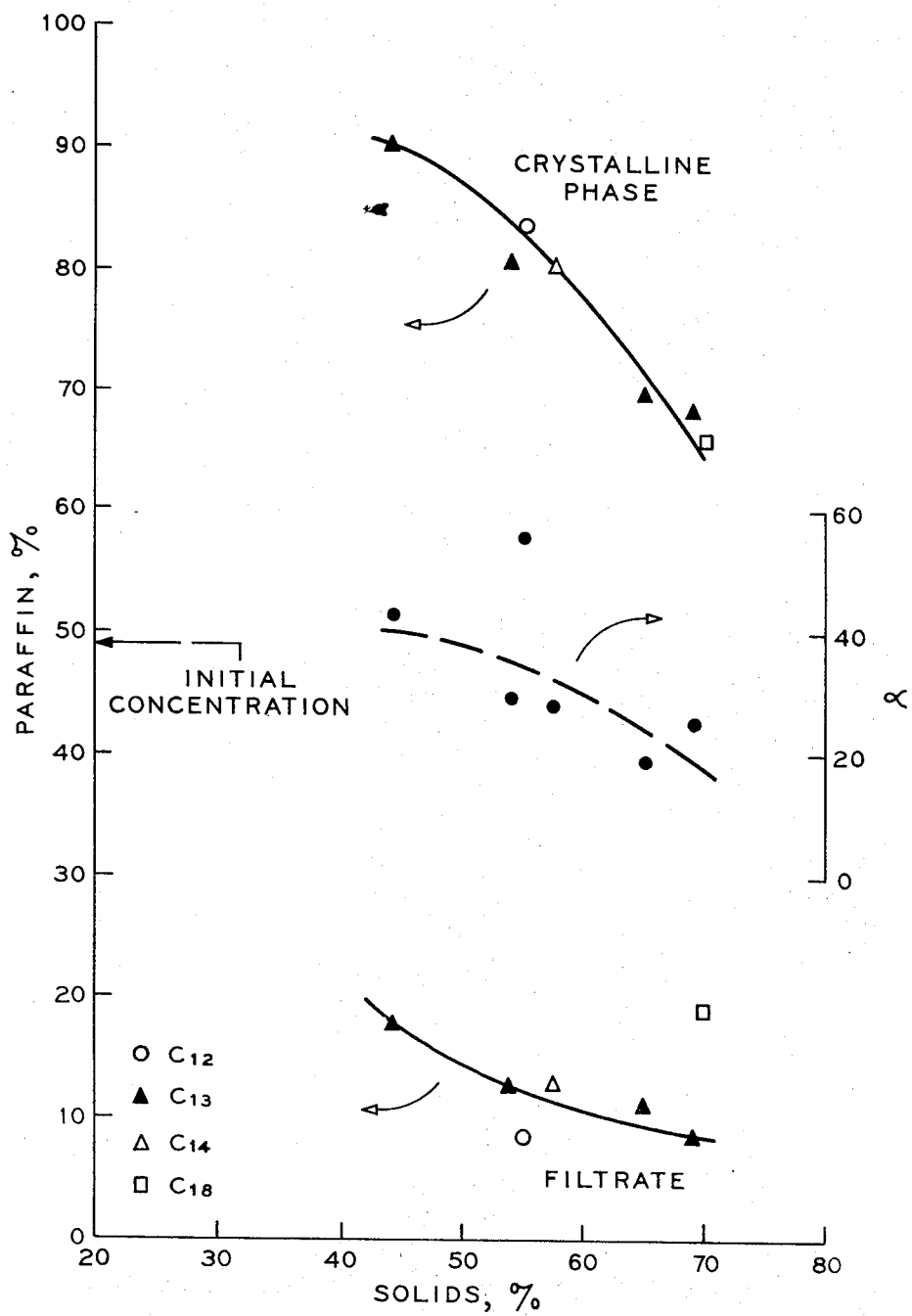
Figure 3:
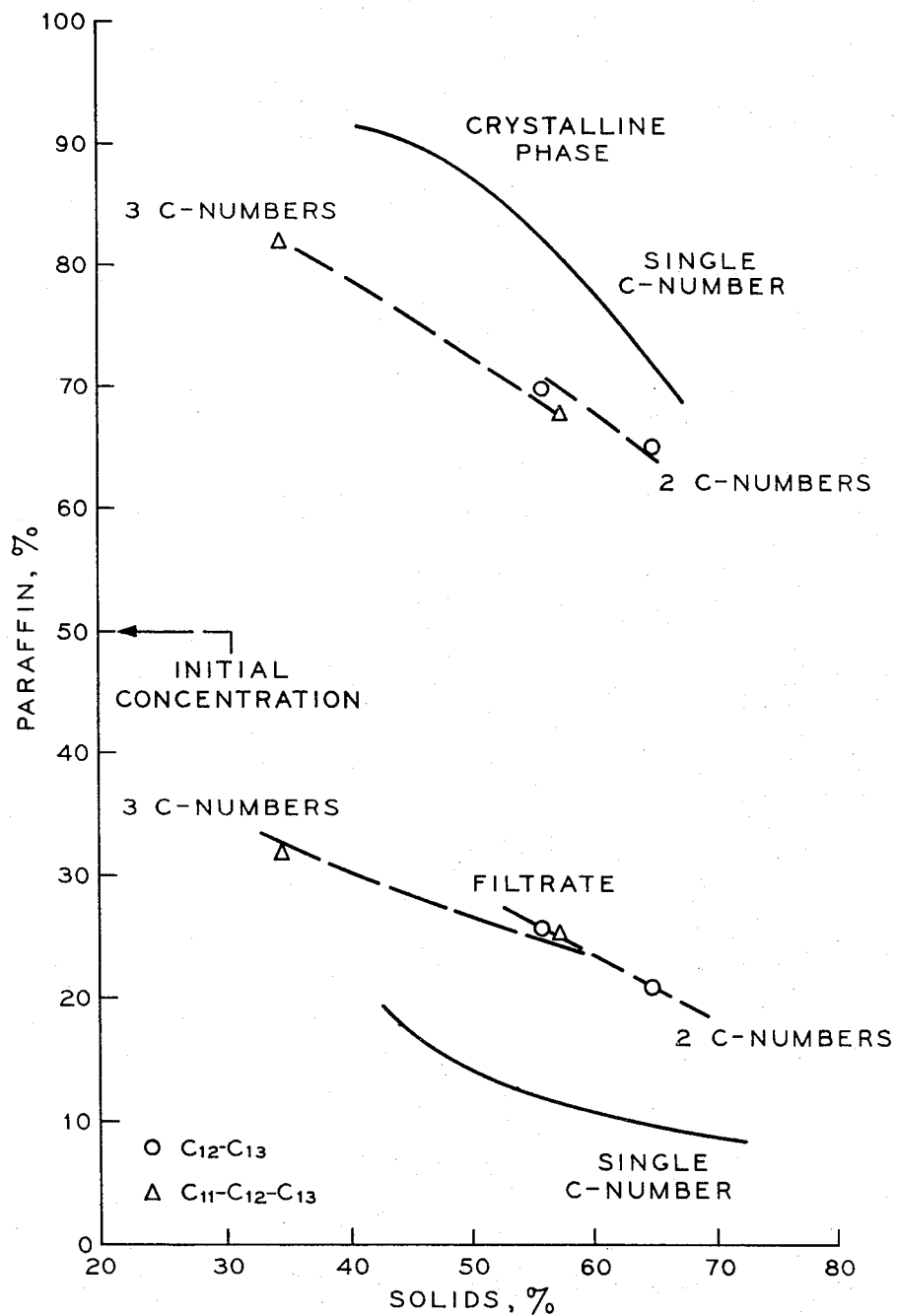
Figure 4:
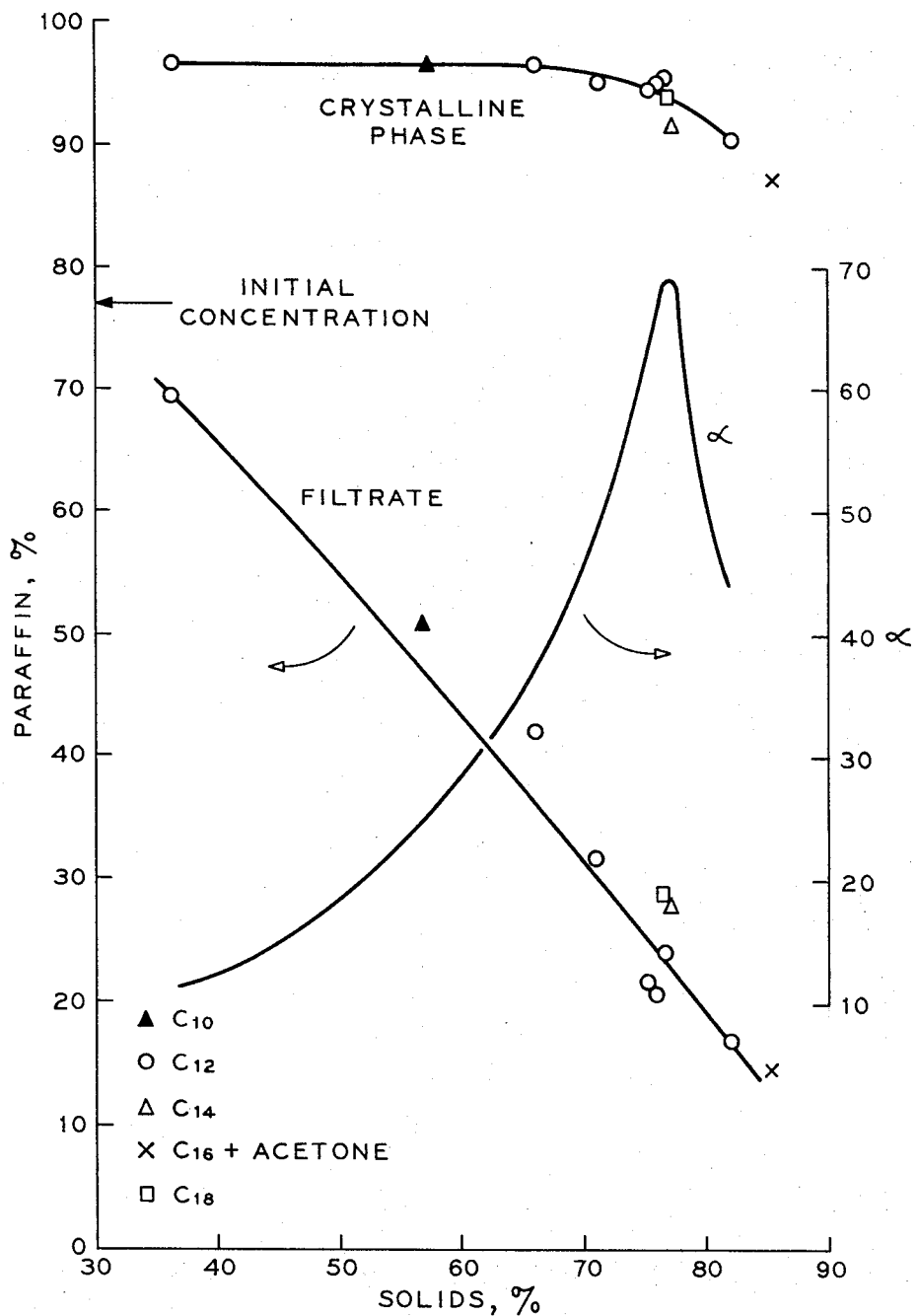
Figure 5:
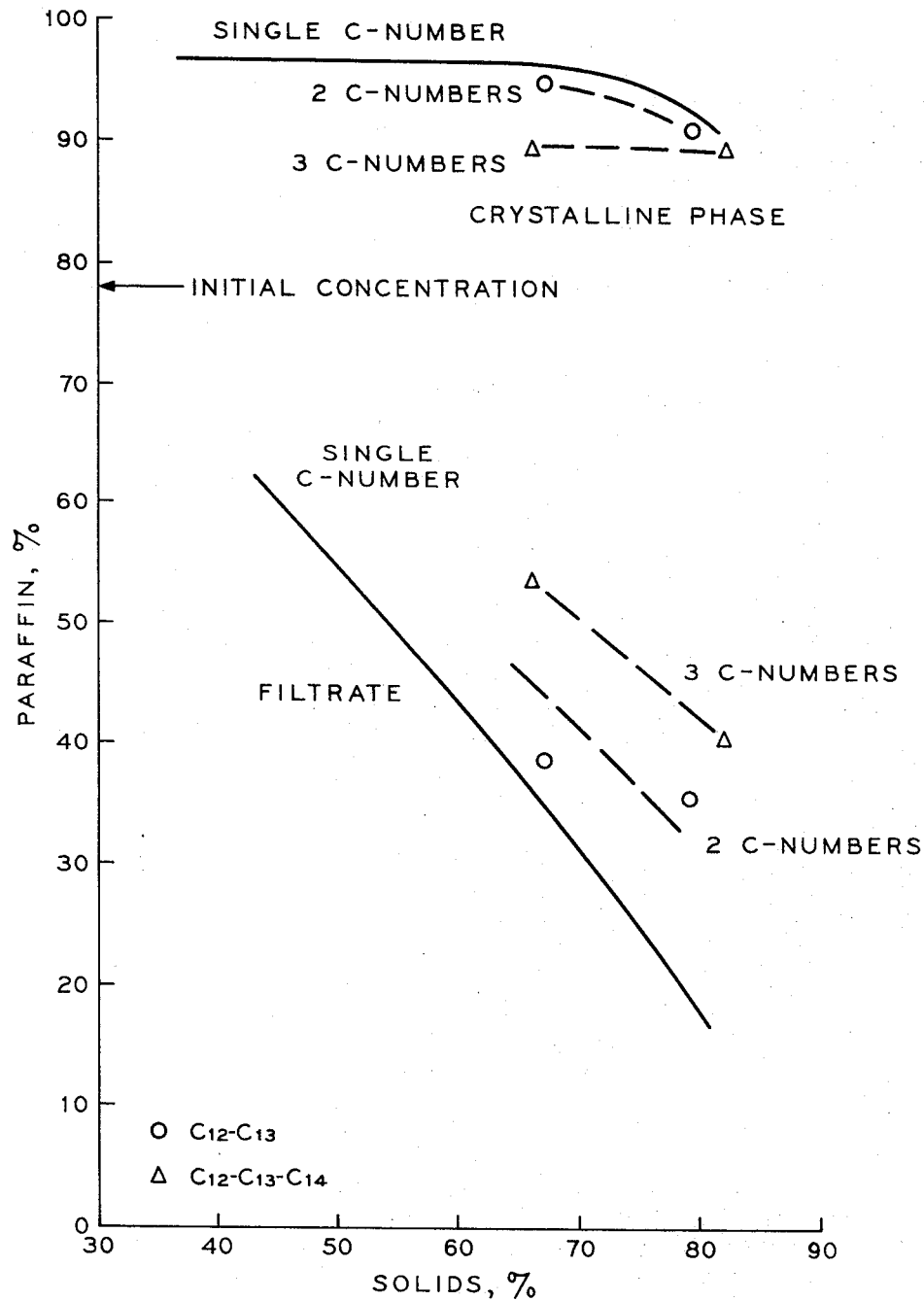

This invention relates to a method for the separation of a mixture of alkane and alkene hydrocarbons. More particularly, it relates to a novel extractive crystallization process for the concentration of alkene hydrocarbons of the $C_{10}$–$C_{20}$ molecular weight range, particularly when the alkene is present as a minor component in admixture with alkane hydrocarbons.

Prior art

The preparation of alkene hydrocarbons by a catalyzed partial dehydrogenation of a suitable alkane hydrocarbon feed is known in the art (see, for example, U.S. Pat. No. 3,531,543, E. Clippinger et al.). In the production of alkene hydrocarbons by such a partial dehydrogenation method, the conversions must be nominal in order to avoid side reactions such as aromatization, cracking and the like. Usually, the conversion is of the order of 5–20 mole percent. The separation or concentration of the olefin fraction from the resulting product mixtures cannot be accomplished by methods which are commercially attractive, for example, by fractional distillation or crystallization, where the hydrocarbon mixture is of the $C_{10}$–$C_{20}$ range. Thus, there is a need for a practical and effective means for concentrating the alkene components of alkene-alkane hydrocarbon mixtures of this range.

SUMMARY OF THE INVENTION

A novel method for separating an acyclic hydrocarbon mixture containing a crystallizable alkane component and an alkene component of the $C_{10}$–$C_{20}$ range has now been found. Provided that the carbon atom contents of the hydrocarbons in the mixture do not differ by more than about 5, the mixture can be fractionated into two separable fractions by contact with liquid carbon dioxide under crystallization conditions. For each volume of the hydrocarbon mixture, an amount of liquid carbon dioxide in the range of from about 1 to 100 volumes is employed for the separation. Suitable temperatures for carrying out the extractive crystallization of the mixture are in the range in which carbon dioxide exists in the liquid phase; that is, from about −57° C. to 31° C. Under these conditions, the mixture is converted to a solid fraction which is rich in the alkane component and to a second fraction, which is a liquid phase rich in the alkene component and these phases are conveniently separated by ordinary means such as decantation, filtration and the like.

Pressure is a dependent variable herein. It must be at least sufficient to maintain the necessary liquid carbon dioxide phase. The temperature-pressure phase relationships for carbon dioxide are, of course, well known in the art.

The molecular weight difference between an alkane and the corresponding alkene is but two units. As mentioned above, this difference is not sufficient to permit a useful separation of alkane-alkene mixtures by conventional means, for example, by an ordinary fractional distillation or fractional crystallization. Surprisingly, an effective separation can be achieved by a fractional crystallization when carried out with the mixture in contact with liquid carbon dioxide, preferably employing carbon dioxide as a solvent medium for the crystallization. The difference between alkane and alkene solubility in liquid carbon dioxide has been found to be sufficient to promote the formation of a solid phase fraction rich in alkane and a liquid phase fraction rich in alkene when there is a limited spread in the carbon atom contents of the several molecular species in a $C_{10}$–$C_{20}$ acyclic hydrocarbon mixture. Preferably the mixture is dissolved in the carbon dioxide and the separation achieved by cooling the resulting solution to a temperature at which a solid hydrocarbon phase develops. Alternatively, where the relative amount of the alkane exceeds the solubility of the alkane in liquid carbon dioxide, a second liquid phase rich in the alkane develops. Upon cooling, the alkane crystallizes from both liquid phases. In a yet further alternative of the invention, a solid alkene-alkane mixture, or a partially solidified alkane-alkene mixture can be intimately contacted with liquid carbon dioxide, for example, by trituration. The resulting solid and liquid phases are then separated by ordinary means, such as centrifugation, filtration, etc.

Thus, the separation method of the invention appears to be an extractive crystallization.

EMBODIMENT

A preferred embodiment of the invention is illustrated in the process flow diagram, FIG. 1, which is a schematic presentation employing a single crystallization stage. A circulate vessel, 4 (a vertical section) is employed as the crystallization zone for the process. This vessel is basically a closed loop of pipe with its major axis in the vertical plane and having a liquid void zone, 19, in contact with the loop proper of the vessel. The vessel also contains a suitable means, for example, a liquid drive unit, 20, for driving the crystallization magma (mixture of liquid carbon dioxide, liquid hydrocarbon and solid alkane-rich hydrocarbons) around the circulate loop of the vessel, 4.

The circulating magma is established in the crystallizer, 4, by charging 60,000 parts (all parts by weight) of liquid carbon dioxide and 5,000 parts of an 80/20 mixture of dodecane-dodecene to the unit at a temperature of about −10° C., circulating the resulting solution in the unit and cooling it to about −40° C. The cooling is achieved by concurrently introducing liquid carbon dioxide into the crystallizer via lines 1 and 2 and withdrawing carbon dioxide gas from the overhead vapor zone 19 of unit 4. Then in the operational mode, 100 parts per hour of the 80/20 hydrocarbon feed mixture at 25° C. is introduced via line 1 and is mixed in line 2 by combining 1,600 parts per hour of liquid carbon dioxide at −12° C. from line 5. The combined hydrocarbon and carbon dioxide stream at about −10° C. is fed to the upflow leg of unit 4 via line 2. As before, evaporative cooling of the magma (mixture of liquid and solid) is effected by withdrawing 400 parts per hour of carbon dioxide from vapor zone 19 via line 6. Under the foregoing conditions and by removing 1,300 parts per hour of the magma (slurry) via line 7, a temperature of about −40° C. and a constant materials balance are maintained in the crystallizer, 4.

The withdrawn slurry is passed via line 7 to the filter unit, 8, where the liquid fraction is separated from the solid fraction. Via line 10, the separated solid is passed to melt tank 11 where it is heated and melted. Residual carbon dioxide is vaporized (about 50 parts per hour) during the melting and is returned to the process via carbon dioxide gas collection line 6 for passage, together with other carbon dioxide recycle streams, to the compressor and refrigerator unit 17. The melted solid, comprising 97% (weight) dodecane and 3% dodecene is removed from the melt tank 11 via line 13 at a rate of about 75 parts per hour. If substantially complete recovery of the dodecene is desired, this mixture is passed to a second crystallization stage.

The separated liquid fraction (filtrate) is passed from filter unit 8 via line 9 to the evaporator, 14, at a rate of about 1,175 parts per hour, where it is heated to about 25° C. for the evaporation of the carbon dioxide content (1,150 parts per hour). The vaporized carbon dioxide is recycled to the process via lines 6 and 15.

The residue collected in unit 14 (25 parts per hour) is a 72/28 weight percent mixture of dodecene and dodecane. If further purification is desired, it too may be withdrawn via line 16 and passed to another crystallization stage.

The gaseous carbon dioxide recycled to the process via lines 6, 12 and 15 is compressed and cooled to about −12° C. and returned to the process via line 5 together with makeup from line 3 as required, i.e., about 1 to 5 parts per hour.

Acyclic hydrocarbon mixtures of the $C_{10}$–$C_{20}$ molecular range containing a crystallizable alkane component and an alkene component are in general separated into two fractions by the method of the invention, again, provided that the carbon content range of molecular species of the mixture is less than about five. These mixtures, in general, are contemplated for use as feeds in the practice of the method and are separated into two separate fractions.

The relative amounts of the alkene and alkane components of the feed mixture may vary widely. As a practical matter (economics), a satisfactory feed will contain more than 5 and less than 90 weight percent of the alkene component.

By a crystallizable acyclic alkane component, as used herein, is meant by definition that a solid phase forms when the liquid alkane component per se is cooled to a temperature in the range in which carbon dioxide exists in the liquid phase, i.e., about −57° C. to 40° C. Thus, the $C_{10}$–$C_{20}$ n-alkanes and alkanes having a minor amount (one or two alkyl branches) of branching are in general representative crystallizable alkane components. Some alkanes with relatively more branching also are crystallizable and are contemplated. They are readily known by reference to standard tables and texts or by the routine test which consists of cooling an aliquot to a temperature in the above range.

The acyclic alkene component of the hydrocarbon mixtures which are separable by the method of the invention are in general those alkenes which:

(1) contain a single carbon-carbon double bond (internal or terminal or mixtures thereof);
(2) have a carbon atom content within the specified range ($C_{10}$–$C_{20}$); and
(3) satisfy the carbon atom content requirement for the feed mixture; i.e., the carbon atom contents of the molecular species in the feed must differ by less than about 5.

The preferred feeds are those in which the mixture is produced by:

(1) partial dehydrogenation of an n-$C_{10}$–$C_{20}$ alkane hydrocarbon, or
(2) the partial chlorination and dehydrochlorination of a $C_{10}$–$C_{20}$ alkane hydrocarbon mixture as known in the art.

In order to satisfy the above-noted carbon atom spread requirement, fractional distillation of broad range mixtures into suitable carbon atom cuts may also be necessary.

Representative acyclic hydrocarbon feeds which are separable by the method herein include decane-decene, dodecane-dodecene, eicosane-eicosene, and the like alkane-alkene mixtures, n-$C_{10}$–$C_{12}$-, n-$C_{11}$–$C_{13}$-, n-$C_{15}$–$C_{18}$-, n-$C_{16}$–$C_{17}$-, n-$C_{11}$–$C_{12}$, n-$C_{10}$ and $C_{12}$, n-$C_{11}$ and $C_{13}$, and the like alkane-alkene mixtures; 2-methylundecane-2-methylundecene, 4-ethyldodecane-4-ethyldodecene and the like moderately branched alkane-alkene mixtures.

The following examples further illustrate the invention. The runs were carried out using a calibrated high pressure (hydrostatically tested at 500 p.s.i.a.) vessel fitted for efficient stirring, for pressure and temperature control and also fitted with charging or sampling inlets or outlets. The sampling line was fitted with a 10-micron metal filter screen to facilitate recovery of liquid samples free of crystalline solids. Thermocouple sensors were appropriately placed for use in obtaining temperature readouts. A surrounding Dry Ice-acetone bath was used to control the temperature of the vessel and its contents, and a high pressure nitrogen gas source, together with suitable connecting lines, was used to maintain the system pressure during sample removals. The latter insured that the sampling was carried out under both isothermal and isobaric conditions.

Liquid carbon dioxide and an alkane-alkene mixture were charged to the pressure vessel, and the temperature of the vessel and its contents was adjusted to insure complete solution of the hydrocarbon mixture in the liquid carbon dioxide. The surrounding bath temperature was then lowered to a solid-forming temperature and maintained at a predetermined level for a period sufficient to establish the equilibrium. During the equilibration the mixture was stirred efficiently. The liquid phase was then removed under pressure va a filter stick (10-micron screen filter element). After removal of the carbon dioxide associated with the separated liquid and solid phases, the residual hydrocarbon was analyzed using gas chromatographic methods and suitable standards.

Examples 1–5

See Table I for conditions and results.

TABLE I
Separation of alkanes from alkenes by fractional crystallization in liquid $CO_2$

| Example number | Item | Amount, g. | Branched, wt. percent | Paraffins, percent (weight) | | | | Olefins, percent (weight) | | | | Equilib. temp., °C. | Total vol., ml. | Percent solids | $\alpha^1$ |
|---|---|---|---|---|---|---|---|---|---|---|---|---|---|---|---|
| | | | | $C_{12}$ | $C_{13}$ | $C_{14}$ | Σ | $C_{12}$ | $C_{13}$ | $C_{14}$ | Σ | | | | |
| 1 | Feed | 5.0 | 0.5 | 24.8 | | | | 74.7 | | | | -40.5 | 46 | 67.2 | 4.0 |
| | Solids | 3.4 | 0.6 | 31.7 | | | | 67.7 | | | | | | | |
| | Filtrate | 1.6 | 0.7 | 10.4 | | | | 88.9 | | | | | | | |
| 2 | Feed | 3.0 | 0.5 | 77.2 | | | | 22.3 | | | | -38 | 46 | 71.3 | 41.8 |
| | Solids | 2.15 | 0 | 95.1 | | | | 4.9 | | | | | | | |
| | Filtrate | 0.85 | 2.1 | 31.7 | | | | 66.2 | | | | | | | |
| 3 | Feed | 3.0 | 0.3 | 49.8 | | | | 49.9 | | | | -45 | 48 | 55.0 | 55.6 |
| | Solids | 1.65 | 0 | 83.6 | | | | 16.4 | | | | | | | |
| | Filtrate | 1.35 | 0.8 | 8.4 | | | | 90.8 | | | | | | | |
| 4 | Feed | 3.0 | 0.3 | 39.6 | 38.2 | | 77.8 | 11.4 | 10.5 | | 21.9 | -41 | 48 | 67.0 | 28.8 |
| | Solids | 2.1 | 0 | 46.0 | 48.7 | | 94.7 | 2.0 | 3.3 | | 5.3 | | | | |
| | Filtrate | 0.9 | 0.8 | 30.0 | 8.3 | | 38.3 | 37.4 | 23.5 | | 60.9 | | | | |
| 5 | Feed | 3.05 | 0.05 | 19.3 | 40.7 | 20.0 | 80.0 | 5.6 | 9.3 | 5.1 | 20.0 | -40 | 48 | 82.0 | 12.7 |
| | Solids | 2.50 | 0 | 17.9 | 48.1 | 23.5 | 89.5 | 2.0 | 3.3 | 5.2 | 10.5 | | | | |
| | Filtrate | 0.55 | 0.1 | 28.6 | 9.6 | 2.0 | 40.2 | 27.3 | 28.6 | 3.8 | 59.7 | | | | |

$^1 \alpha =$ selectivity constant $= \dfrac{K_1}{K_2} = \dfrac{S_p}{F_p} \times \dfrac{F_o}{S_o}$.

where $K_1 = S_p/F_p$;
$K_2 = S_o/F_o$.
$S_p =$ The concentration of alkanes in the crystalline phase.
$S_o =$ The concentration of alkenes in the crystalline phase.
$F_p =$ The concentration of alkanes in the filtrate phase.
$F_o =$ The concentration of alkenes in the filtrate phase.

The above examples demonstrate that alkane-alkene mixtures of the $C_{10}$–$C_{20}$ range are effectively fractionated by crystallization from a liquid carbon dioxide medium.

The results from Examples 1–5 and of analogous examples (except that the feeds had C-number values and alkane-alkene ratios as indicated) are illustrated in FIGS. 2–5. The left-hand vertical axis of these figures shows the percent alkane(s) in the separated hydrocarbon phases (carbon dioxide free). The horizontal axis shows the percent solids recovered. Each pair of points, one for the crystalline phase and one for the filtrate, represents one set of measurements. The right-hand vertical axis gives the calculated α-values derived from the data. These examples further show that the crystallized solid is predominantly alkane, and the hydrocarbon portion of the liquid phase (filtrate) is richer (relative to the feed mixture) in alkene. Again, these data demonstrate useful selectivities and effective separations of $C_{10}$–$C_{20}$ alkane-alkene hydrocarbon mixtures into a solid phase rich in the alkane component and a liquid phase enriched in the alkene component.

These examples further demonstrate that feeds having single and multiple C-number component mixtures up to and including a 4 C-number component (i.e., $C_{12}$, $C_{13}$, $C_{14}$ and $C_{15}$, for example) are separated by the method of the invention. Depending upon the desired degree of purity of the recovered components, alkane or alkene, one or more crystallization stages may be employed. In view of the substantial selectivity values for the separations, only a few stages, 2–4, are required for the recovery of substantially (90%+) pure product.

It will be apparent that various changes and modifications may be made in the operations described in the foregoing without departing from the scope of the invention as defined in the appended claims. It is intended, therefore, that all matter contained in the above description of the invention shall be interpreted as illustrative only and not as limitative.

I claim:
1. The method for the separation of an acyclic hydrocarbon mixture into two fractions, said mixture containing a crystallizable alkane component and an alkene component, said fractions relative to said mixture being a first fraction, which is a solid phase rich in the alkane component, and a second fraction, which is a liquid phase rich in the alkene component, said mixture being of hydrocarbons having a carbon atom content in the range from about 10 to 20 wherein the differences in the carbon atom content between said hydrocarbons of said mixture is less than about 5; said alkane component having a melting point in the range from about −57° C. to 40° C., said alkene component comprising from 5 to 90 weight percent of said hydrocarbon mixture, which comprises forming said liquid and said solid fractions by contacting said mixture with liquid carbon dioxide at a temperature within the range of from about −57° C. to 31° C., and separating said liquid and solid fractions.

2. The method as in claim 1 wherein said mixture is dissolved in liquid carbon dioxide and the resulting solution is cooled.

3. The method as in claim 2 wherein:
   (a) said mixture is an 80–20 dodecane-dodecene mixture which is cooled to about −40° C., and
   (b) wherein said resulting fractions are separated by filtration.

4. The method as in claim 1 wherein said hydrocarbon is an n-alkane-n-alkene mixture.

References Cited
UNITED STATES PATENTS

| | | | |
|---|---|---|---|
| 2,188,051 | 1/1940 | Lantz | 208—316 |
| 2,221,093 | 11/1940 | Hillman et al. | 208—316 |
| 2,631,966 | 3/1953 | Francis | 208—321 |
| 2,646,387 | 7/1953 | Francis | 208—321 |
| 2,698,277 | 12/1954 | Francis | 208—324 |
| 2,698,276 | 12/1954 | Francis | 208—324 |
| 3,531,543 | 9/1970 | Clippinger et al. | 260—683.3 |

DELBERT E. GANTZ, Primary Examiner

J. M. NELSON, Assistant Examiner

U.S. Cl. X.R.
62—58; 260—677 A